Sept. 13, 1966      P. B. MacCREADY, JR      3,272,974
UNIVERSAL TURBULENCE INDICATOR
Filed April 8, 1963      3 Sheets-Sheet 1
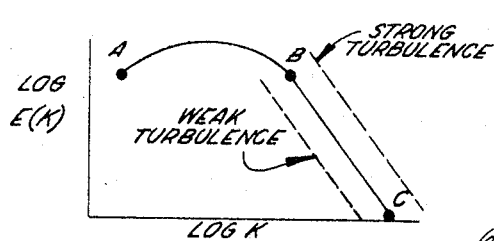
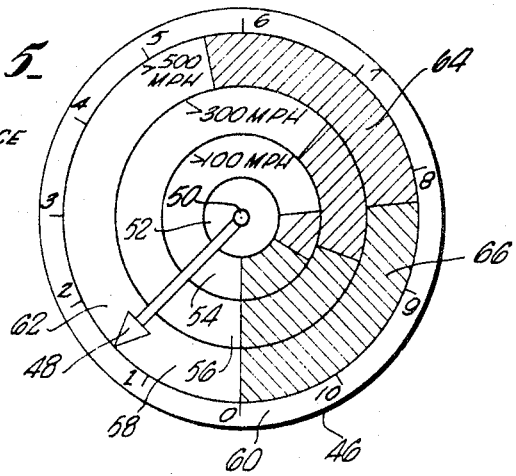
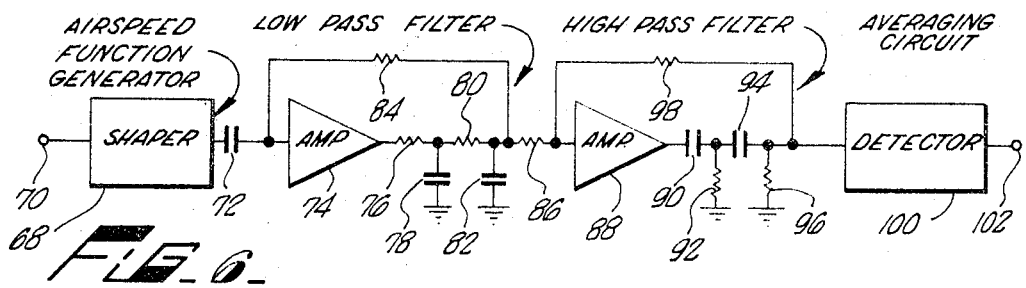
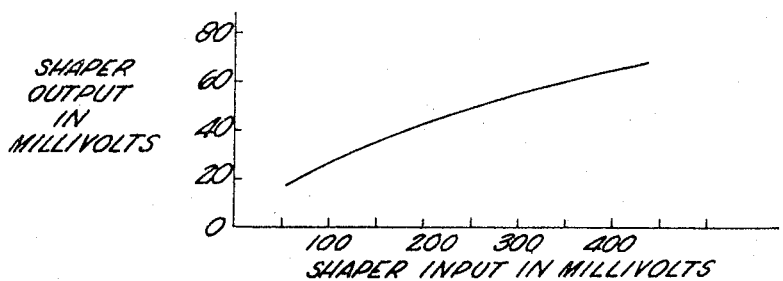
INVENTOR.
PAUL B. MAC CREADY, JR.
BY
Christie, Parker & Hale
ATTORNEYS

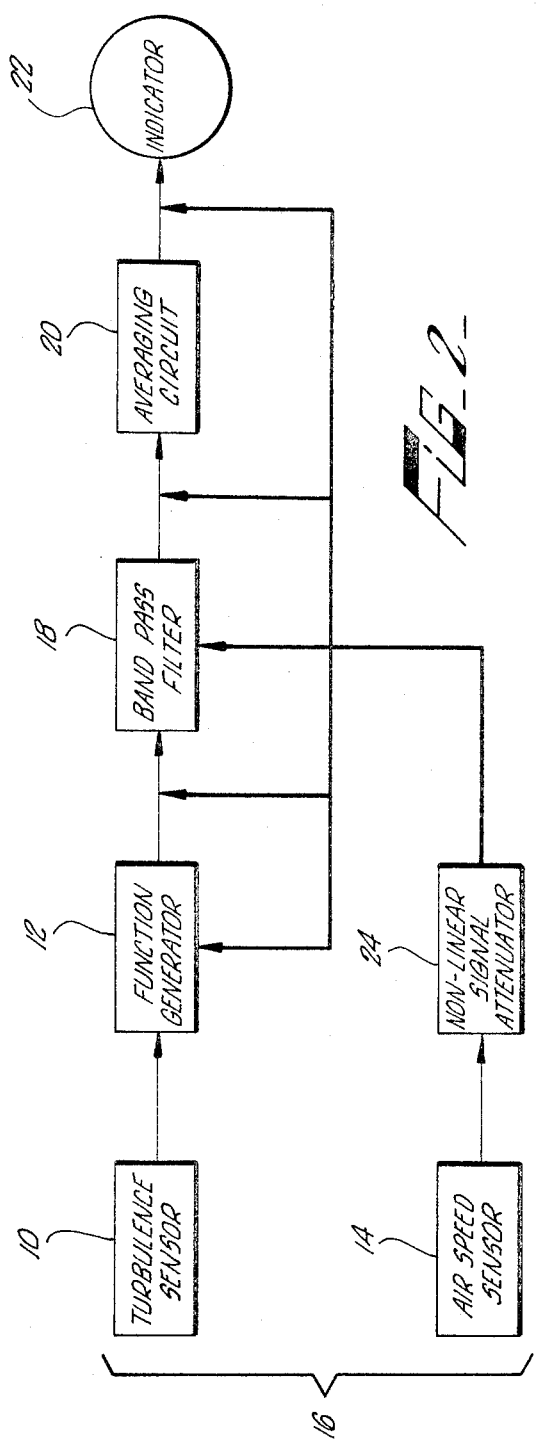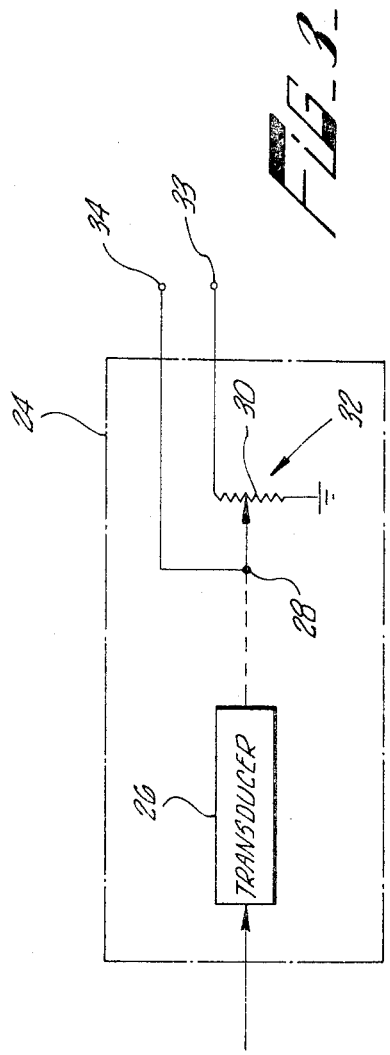

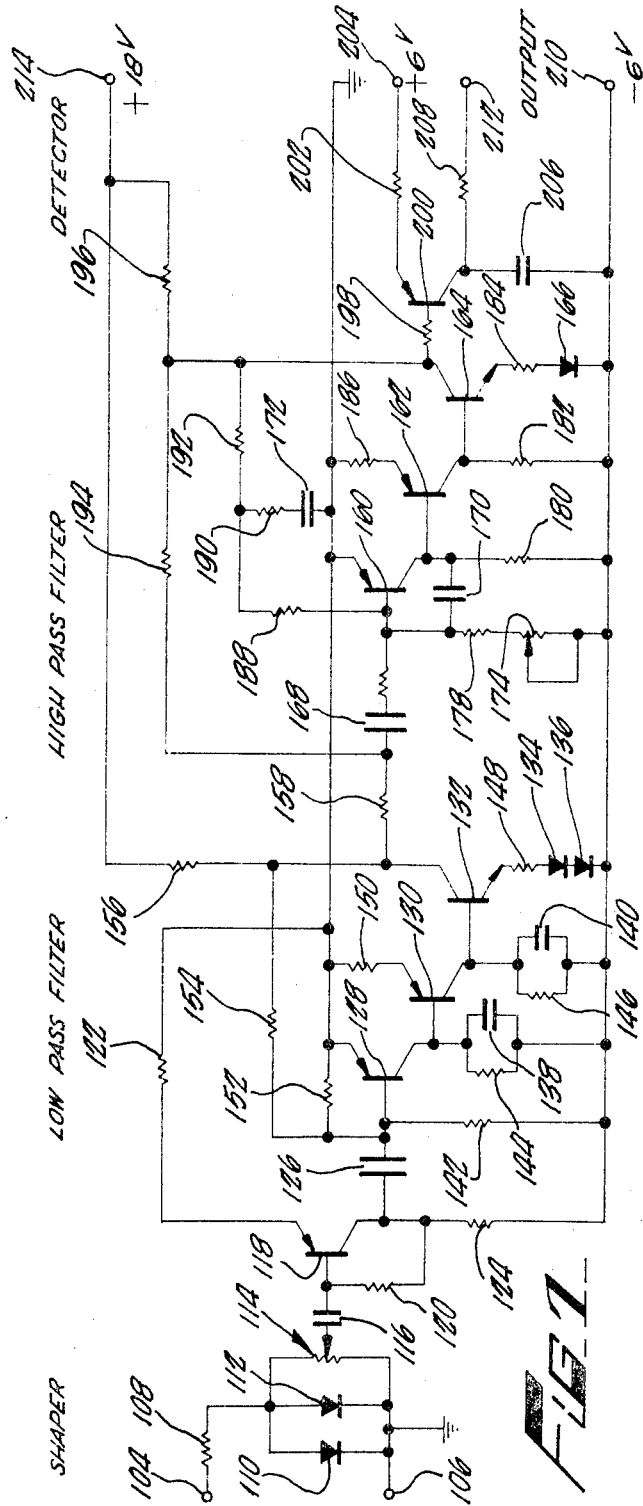

United States Patent Office 3,272,974
Patented Sept. 13, 1966

3,272,974
UNIVERSAL TURBULENCE INDICATOR
Paul B. MacCready, Jr., Pasadena, Calif., assignor to Meteorology Research, Inc., Altadena, Calif., a corporation of California
Filed Apr. 8, 1963, Ser. No. 271,408
8 Claims. (Cl. 235—151.3)

This application is a continuation-in-part of the copending patent application, Serial No. 219,643, filed August 27, 1962, and relates to the measurement of fluid turbulence, particularly air turbulence as encountered by aircraft in flight.

The measurement of turbulence has become of increasing importance in recent years due to the design of modern jet aircraft. Air turbulence can be related directly to the gust loads encountered by an aircraft. Gust loads are pertinent with respect to the structural stability of the aircraft and the fatigue loads encountered thereby, as well as stability and control characteristics and passenger comfort. Heretofore, air turbulence measured by an aircraft in flight has been the apparent turbulence determined by the response of the aircraft to the particular circumstances. As a result, no standard has been available for the measurement of air turbulence since aircraft of different design react differently, even at the same speed, to similar conditions of turbulence.

In view of this, the present invention provides a universal turbulence indicator for simply and accurately measuring fluid turbulence in terms of a standard which is independent of the mean velocity of the fluid passing the indicator. The universal turbulence indicator is particularly applicable to aircraft and for simplicity of understanding will be described with reference to aircraft and the specific problems associated therewith.

Briefly, the present invention makes use of the recognized fact that the spectrum of fluid turbulence, which is the turbulent energy distribution over a range of wavelengths of turbulent eddies in the fluid, is substantially isotropic and follows a known predetermined curve over the range of wavelengths which, in the case of atmospheric turbulence, constitute the primary source of turbulence contributing to the problems of aircraft fatigue, passenger comfort, structural loads, stability and aircraft control. In particular, over such a range of wavelengths, which in the atmosphere generally extends from about two hundred to three hundred meters to substantially zero, the turbulent energy spectrum is substantially proportional to the reciprocal of wavelength ($k=1/\lambda$) to the five-thirds power. Therefore, the predictable portion of the turbulent energy spectrum may be termed the five-thirds power range.

It has been found that within the five-thirds power range the value of both horizontal and vertical turbulence depends upon a single quantity, $\epsilon$, which is defined as the equilibrium rate of dissipation of turbulence energy. The mathematical relationships for $\epsilon$ for vertical and horizontal turbulence, which have been derived theoretically and experimentally verified, are as follows:

$$G(k) = \tfrac{4}{3} C_2 \epsilon^{2/3} k^{-5/3} \qquad (1)$$

and $$E(k) = \tfrac{3}{4} G(k) = C_2 \epsilon^{2/4} k^{-5/3} \qquad (2)$$

where $k$ is the wavenumber—the number of cycles per unit distance, or the reciprocal of the wavelength of the eddy, measured along the flightpath; $G(k)$ is twice the vertical turbulent energy per unit mass per unit wavenumber; $E(k)$ is twice the longitudinal turbulent energy per unit mass per unit wavenumber; and $C_2$ is a dimensionless coefficient in the order of unity (about 0.33 according to some experiments). The dissipation factor $\epsilon$ therefore provides the standard for fluid turbulence measurement in the present invention. In particular, a determination of both horizontal and vertical turbulence follows directly from a measurement of $\epsilon$.

To provide such a determination of fluid turbulence in terms of the standard $\epsilon$, the universal turbulence indicator of the present invention basically includes a combination of a turbulence sensor and function generator together with a band pass filter characterized by passing only frequencies corresponding to wavelengths within the five-thirds power range, and means for measuring the RMS value of the output of the pass band filter.

There presently exist many different forms of turbulence sensors and function generators, any one of which may be employed in the present invention. Each sensor and generator combination has the common characteristic of producing a voltage signal which may be represented by the expression:

$$v = H(U_0)u \qquad (3)$$

where $v$ is the voltage signal generated by the sensor, $U_0$ is the mean speed of the fluid passing the indicator, $H(U_0)$ is a predetermined voltage function generated by the sensor which is characteristic of the particular sensor employed and varies as a function of the mean fluid speed $U_0$, and $u$ is the turbulent fluid velocity fluctuation in any direction about the mean fluid speed $U_0$.

For fluid turbulence within the five-thirds power range of the turbulence spectrum, the frequency of the turbulence is proportional to $k$ and $U_0$. Therefore, it can be shown that, $J(f)$, the spectrum of the voltage $v$ as a function of the frequency $f$ may be represented by the expression:

$$J(f) = [H(U_0)]^2 C_2 U_0^{2/3} \epsilon^{2/3} f^{-5/3} \qquad (4)$$

In the present invention the fluctuating voltage $v$ is applied to a band pass filter. The band pass filter has an admittance function $A(f)$ which is non-zero only for frequencies corresponding to the wavelengths within the five-thirds power range and produces an output voltage $p$. The R.M.S. value of $p$, $\overline{p^2}$, can be measured by a variety of standard techniques. One convenient method is to rectify the output voltage $p$ of the band pass filter and electronically average the rectified signal. The resulting output signal $q$ is then proportional to the square root of $\overline{p^2}$ for turbulence having a Gaussian velocity distribution and may be represented by the expression:

$$q = H(U_0) U_0^{1/3} \epsilon^{1/3} \left[ \sqrt{C_2 \int_0^\infty A^2(f) f^{-4/3} df} \right] \qquad (5)$$

The term in brackets is a constant $K_2$. Therefore the expression for the resulting output voltage $q$ becomes:

$$q = K_2 [H(U_0) U_0^{1/3}] \epsilon^{1/3} \qquad (6)$$

From the expression (6) it is to be noted that the turbulence indicator reads $\epsilon$ indirectly, independent of the fluid speed $U_0$, if the term within the large bracket is equal to unity or is independent of fluid velocity. This is the case when the turbulent sensor includes means for directly measuring the velocity of a fluid passing the indicator and means for generating the voltage which equals $U^{2/3}$, where $U$ is equal to $U_0$ plus $u$. In this case $H(U_0)$ becomes $2/3 U_0^{-1/3}$.

With other types of sensors, however, for the indicator to directly read $\epsilon$ independent of $U_0$, there must be an attenuation of the signal in the indicator instrument by a factor $I(U_0)$ such that $H(U_0)I(U_0)$ equals $U_0^{-1/3}$. In such cases the over-all expression for the resulting output voltage $q$ becomes:

$$q = K_2 [H(U_0) I(U_0) U_0^{1/3}] \epsilon^{1/3} \qquad (7)$$

Thus the indicator will directly read $\epsilon$, independent of $U_0$, if the term within the large bracket is equal to unity. Such an attenuation of the signal in the indicator instrument may be provided by either attenuating the resulting output signal or by attenuating the fluctuating signal before, within, or after the band pass filter.

If, for example, the sensor voltage is proportional to the square of the fluid velocity, when the voltage fluctuations are related to turbulent fluid velocity fluctuations by $U_0$ and the needed attenuation factor $I(U_0)$ is $U_0^{-4/3}$. If the sensor voltage is linear with velocity, the attenuation factor $I(U_0)$ is $U_0^{-1/3}$. If the sensor is a direction vane, the voltage fluctuations are proportional to the turbulent velocity $u$ divided by $U_0$. In such a case the needed attenuation factor $I(U_0)$ is $U_0^{2/3}$. If the sensor is an accelerometer, located for example near the center of gravity of an aircraft, the characteristic of the aircraft must be known for each airspeed. The needed attenuation factor may then be computed and included in the processing of the signal in the indicator instrument in any one of the manners described above.

The means for providing the necessary attenuation factor may take any number of different forms, possibly the simplest of which includes a transducer for sensing the mean fluid velocity $U_0$ to control the position of a movable arm and a potentiometer wound in accordance with the attenuation function to be generated.

Thus, by a simple combination of a fluid turbulence sensor and function generator, a band pass filter, and means for measuring the RMS value of the output of the filter, and in a more general case an attenuation network, the present invention provides means for simply and accurately measuring fluid turbulence in terms of the standard $\epsilon$ independent of the mean velocity of the fluid passing the indicator. In particular, the indicator is applicable to all aircraft regardless of design and provides a means for measuring air turbulence in terms of $\epsilon$ independent of mean airspeed.

The above as well as other features of the present invention may be more clearly understood by reference to the following detailed description when considered with the drawings, in which:

FIGURE 1 is a logarithmic graphical representation of the atmospheric turbulence spectrum;

FIGURE 2 is a block diagram of an air turbulence indication system according to the present invention illustrating the different points at which an attenuation factor may be introduced to provide a direct indication of $\epsilon$ independent of $U_0$;

FIGURE 3 is a schematic, block diagram representation of one form of the nonlinear signal attenuator represented in FIGURE 2;

FIGURE 4 is a block diagram representation of a preferred form of the air turbulence indication system of the present invention;

FIGURE 5 shows the face of an indicator for use in indicating air turbulence;

FIGURE 6 is a block diagram of an electronic circuit for converting an electrical potential proportional to air speeds sensed into an electrical output for application to the indicator;

FIGURE 7 is a circuit diagram according to the block diagram of FIGURE 6;

FIGURE 8 is a graphical representation of the relationship between the input and output for the shaper of FIGURE 7;

FIGURE 9 is a graphical representation of the pass band of the low pass filter from FIGURE 7;

FIGURE 10 is a graphical representation of the pass band of the high pass filter of FIGURE 7; and FIGURE 11 is a graphical representation of the output of the combined pass band of the low and high pass filters of FIGURE 7.

Referring now to FIGURE 1, there is shown a logarithmetic graphical representation of an atmospheric turbulent spectrum, i.e. the relationship of $E(k)$, defined as twice the longitudinal turbulence energy per unit mass per unit wavenumber, to $k$, the wavenumber (which is the reciprocal of the wavelength). Since $k$ represents the reciprocal of the wavelength, longer wave lengths are represented between points A and B on the curve. Point B may correspond roughly to wavelengths on the order of two to three hundred meters. It is to be noted that the representation of the relationship from point A to point B is a curve, whereas the representation between point B and point C is a straight line. This latter portion of the graphical representation corresponds to the five-thirds power range of the atmospheric turbulence spectrum for which the previously described equations apply. It is further to be noted that the linear portion of the curve is shifted upwardly in the case of strong turbulence and downwardly in the case of weak turbulence.

FIGURE 2 is a block diagram representation of a general form of the apparatus for indicating air turbulence. In FIGURE 2 a turbulent sensor 10 is arranged to respond to air turbulence and apply a signal to a function generator 12 which produces a voltage corresponding to the previously defined expression $v=H(U_0)u$. The turbulent sensor 10 may take any one of a plurality of different forms. By way of example, the turbulent sensor may comprise a propellor for rotating with an angular velocity proportional to the airspeed U passing the propellor, a direction vane for turning to a direction determined by the lateral direction of air turbulences passing the vane, or an accelerometer located near the center of gravity of a moving aircraft. As previously described, the expression for $H(U_0)$ is different for each of the different types of sensors employed. In particular, for all but the accelerometer arrangement the function generator 12 combines with the turbulent sensor 10 to produce a voltage which (ignoring constants of proportionality) corresponds to the expression:

$$v=U_0 i_u \qquad (8)$$

where the value of $i$ is determined by the particular sensor employed. In such instances the sensor employed as the turbulence sensor 10 may also act as the airspeed sensor represented at 14 in a combined unit 16.

The combined unit 16, as well as the air speed sensor 14, when separated from the combined unit, is arranged to measure relative velocity of air with respect to the body containing the sensor. While ordinarily such a body would be an aircraft in flight, the invention is equally applicable to balloons and the like or may be utilized as a stationary sensor, for example, to determine air turbulence at ground level.

The air speed sensor 14, alone, or in combination with the unit 16 functions in a manner to be hereinafter described to provide control over a nonlinear attenuation signal for combining with the voltage developed by the function generator 12 to provide a direct indication of $\epsilon$ independent of mean air speed $U_0$.

Electrical signal output from the function generator 12 is applied to a band pass filter 18. As previously described, the band pass filter is designed to only pass frequencies corresponding to turbulence wavelengths within the five-thirds power range of the turbulent energy spectrum. Preferably, for accuracy, the upper limit of the pass band corresponds to wavelengths for which the sensor responds accurately.

The output of the pass band filter 18 is applied to an averaging circuit 20 which functions to average the electrical output for the pass band filter 18 so as to provide a usable electrical output for an indicator 22. The electrical output of the averaging circuit 20 is applied to the indicator 22 in order to provide, in the preferred embodiment, visual indication of the turbulence being counted. Of course, the indicator 14 may be a recorder or the like.

As previously described, by applying the voltage generated by the function generator 12 through a pass band filter having the predetermined pass band characteristics and by averaging the output of the filter a resultant output signal $q$, is produced which may be represented by the expression $K_2[H(U_0)U_0^{1/3}]\epsilon^{1/3}$. From this expression it is to be noted that the indicator 22 reads $\epsilon$ directly independent of air speed $U_0$ if the term within the large bracket is equal to unity. This case represents the preferred form of the present invention to be hereinafter described in detail in connection with FIGURES 4 through 11. For the more general case, which is applicable to any type of sensor employed, if the indicator is to directly read $\epsilon$ independent of $U_0$ there must be an attenuation of the signal in the indicator instrument by a factor $I(U_0)$ such that $H(U_0)I(U_0)U_0^{1/3}$ equals unity. Such an attenuation factor is provided by the combination of the air speed sensor 14 together with the nonlinear signal attenuator 24.

The actual attenuation factor provided by the signal attenuator 24 is different and has a predetermined value for different types of turbulent sensors employed. As previously indicated, if the voltage normally generated by the combination of the sensor 10 and generator 12 is proportional to the square of the air velocity then the voltage fluctuations are related to the turbulent air velocity fluctuations by $U_0$ so that the needed attenuation factor is $U_4^{-4/3}$. If the voltage is linear with velocity the attenuation factor is $U_0^{-1/3}$. When a direction vane is employed as the turbulent sensor 10, the voltage produced by the function generator 12 is proportional to the air turbulence divided by the means air velocity so that the needed attenuation factor is $U_0^{2/3}$. For the case of an accelerometer, the characteristics of the aircraft must be known for each speed. The needed attenuation factor can then be computed for each means air speed and included in the processing of the signal in the indicator instrument.

The attenuation factor generated by the nonlinear signal attenuator 24 may be introduced into the series connection between the turbulent sensor 10 and the indicator 22 at any one of a number of different points. The different points are indicated by the plurality of solid arrows leading from the nonlinear signal attenuator 24. By way of example, the attenuation factor may be introduced into the function generator 12 itself to modify the output signal generated thereby or may be included in the input circuit of the band pass filter 18. Likewise the attenuation factor may be included within the band pass filter 18 or at its output circuit. The attenuation factor may also be introduced at the output of the averaging circuit 20 leading to the indicator 22. Regardless of the point at which the attenuation factor is introduced, the end result is that the resultant factor $$H(U_0)I(U_0)U_0^{1/3}$$

is equal to unity and the resultant output signal $q$ becomes equal to $K_2\epsilon^{1/3}$. Thus, with the addition of the attenuation factor provided by the nonlinear signal attenuator 24, the turbulence indicator of the present invention directly reads $\epsilon$ independent of mean air speed $U_0$. Hence the turbulence indicator of the present invention provides means for directly indicating both of the horizontal and vertical turbulence about the indicator. Since the indicator is in terms of the standard $\epsilon$ it is applicable to all aircraft and is independent of the mean air speed about the indicator.

The signal attenuator 24 may take a number of different forms, one of which is illustrated in FIGURE 3. As represented, the nonlinear signal attenuator 24 includes a transducer 26 for receiving the output of an air speed sensor 14. The output of the air speed sensor 14 may be in the form of a pressure, velocity, or electrical signal and is operated on by the transducer to produce a mechanical output which controls the position of a movable arm 28 along the resistance winding 30 of a potentiometer 32 in accordance with relative airspeed sensed by the sensor 14. The signal from the indicator instrument is applied to an input terminal 33 coupled to the resistance winding 30 and passes to an output terminal 34 coupled to the movable arm 28. In passing through the portion of the resistance winding 30 between the input terminal 33 and the arm 28 the instrument signal is attenuated by a factor determined by the manner in which the resistance winding is wound. The resistance winding 30 may be wound to follow any predetermined nonlinear function. Thus, for any given instrument signal the resistance winding 30 may be wound to produce a resulting voltage signal in which $H(U_0)I(U_0)U_0^{1/3}$ equals unity. The nonlinear signal attenuator 24, as arranged, is suited for addition to the series path of the indicator instrument at any of the points indicated to provide means for directly reading $\epsilon$ independent of mean airspeed.

As previously indicated, the preferred form of the present invention does not require the use of a separate attenuator network to provide a direct reading of $\epsilon$ independent of airspeed. In such a case the output signal generated by the function generator 12 is represented by the expression $v=U_0^{-1/3}u$ ignoring constants of proportionality. A block diagram of the preferred form of the turbulence indicator is represented in FIGURE 4. In FIGURE 4 an airspeed sensor 36 measures the relative velocity of the air with respect to the body containing the sensor. The output of the airspeed sensor 10 is applied to an airspeed function generator 38. The output of the airspeed function generator 38 is a voltage which is proportional to the two-thirds power of the airspeed sensed. Many ways are available to generate or derive continuously the two-thirds power of airspeed. For example, the dynamic pressure or total head minus static pressure can be used in a standard pressure transducer to move the wiper arm on a potentiometer. Since the square of the airspeed is proportional to the dynamic pressure, which is proportional to $U^2$ and $V^3$, the potentiometer is then wound to give a cube root function, and thus generate V. As another example, the transducer can simply yield a voltage proportional to $U^2$, and the cube root of $U^2$ be obtained by an analog curve shaper. As another example, the sensor can be a wind driven propeller generating a voltage proportion to U. A curve shaper can then provide a voltage corresponding to $U^{2/3}$.

The electrical signal output of the airspeed function generator 38 is applied to a band pass filter 40. As has previously been described, the band pass filter is designed to have a pass band which will pass frequencies corresponding to turbulence wavelengths within the five-thirds power range. It should be recognized, however, that for frequencies less than one cycle per second, with respect to aircraft and the like, the action of the pilot may have a significant effect on the speed sensed. Therefore, preferably, the band pass filter has a low frequency cutoff of about one cycle per second when the airspeed sensor is, itself, moving. At the speeds for which the invention is most useful, an eddy wavelength maximum of about two hundred meters results in an upper limit for the pass band of about ten cycles per second, assuming that the airspeed sensor accurately measures speed fluctuations of such a frequency. In any event, however, the pass band should not exceed the responsiveness of the airspeed sensor. As an example, a pass band of from two to four cycles per second is appropriate for an aircraft flying at three hundred feet per second and having an airspeed sensor with a time constant of one-hundredth of a second as its responsiveness characteristic.

The output of the band pass filter 40 is applied to an averaging circuit 42, which functions to average the electrical signal output of the band pass filter 40 so as to provide a usable electrical output for an indicator 44.

The indicator 44, as shown in FIGURE 3, has a face 46 on which is mounted a pointer 48 by means of a pivot 50. The face 40 is divided into five concentric annular portions 52, 54, 56, 58 and 60. The inner annular portion 52 is used for mounting the pointer 48. The outer annular portion 60 contains arabic numbers zero through ten in a spaced relationship. This outer portion provides a numerical indication of absolute turbulence, $\epsilon^{1/3}$, in an arbitrary system. The annular portion 58 corresponds to speeds greater than five hundred miles per hour and contains a safe section 62, a warning cross-hatched section 64 and a danger cross-hatched section 66. The annular portions 54 and 56 correspond respectively to speeds greater than one hundred miles per hour, and greater than three hundred miles per hour, and are similarly divided into three sections. Thus, by observing the position of the pointer, an absolute measurement of turbulence can be obtained from the arabic numbers. In addition, the warning and danger sections in the annular portions 54 and 56 and 58 are selected with respect to the particular type of aircraft concerned in order to provide the appropriate warning and danger indications. Thus, the indicator provides an absolute reference for turbulence so that one type of aircraft may make a turbulence report which may be utilized by aircraft of other types, and further provides an indication appropriate for the particular aircraft as to safety with respect to the turbulence being encountered. Thus, upon receiving a report as to turbulence in units of from one to ten, the pilot of an aircraft different from the type making the report, can, by inspection of his own indicator, determine whether or not he will be required to reduce his speed or avoid the turbulence in order to maintain safe flight.

FIGURE 6 is a block diagram of an electronic circuit for the airspeed function generator 38, the band pass filter 40, and averaging circuit 42. The airspeed function generator 38 consists of a shaper 68, having an input terminal 70 to which is applied an electrical potential which is a function of the airspeed sensed. The shaper operates to provide an output which is a function of the two-thirds power of the input signal applied to the terminal 70. The output of the shaper 68 is applied by means of a coupling capacitor 72 to a low pass filter consisting of an amplifier 74, a pair of filter networks consisting of resistor 76, capacitor 78 and resistor 80, capacitor 82, and a feedback resistor 84 connected between the output and the input of the low pass filter. The low pass filter is thus an active filter network so as to provide a sharp cutoff at the upper end of the pass band, as will be described more fully subsequently. The output of the low pass filter is applied by a coupling capacitor 86 to a high pass filter consisting of an amplifier 88, a pair of filter networks consisting of capacitor 90 and resistor 92, and capacitor 94 and resistor 96, and a feedback resistor 98 connected between the output and input of the high pass filter. Thus, the high pass filter is also an active filter, so as to provide a sharp low frequency cutoff. A detector 100 is connected to the output of the high pass filter, and functions to detect the electrical output of the circuit and apply it to a terminal 102 to which may be connected an appropriate indicator, such as a voltmeter.

Referring now to FIGURE 7, there is shown a circuit diagram of the electronic circuit of FIGURE 6. In FIGURE 7, an electrical potential which is a function of the airspeed, is applied across a pair of input terminals 104, 106. Assuming that the electrical potential is positive, the terminal 106 is connected to ground so as to provide a common connection, and the positive airspeed potential is applied to the terminal 104. A resistor 108 is connected to the terminal 104. A pair of diodes 110, 112 are connected in parallel between the resistor 108 and ground. The resistor 108 and diodes 110, 104 constitute a shaper circuit whose output varies as the two-thirds power of the electrical input signal is applied to the terminal 104. The output characteristic is shown more fully in FIGURE 8, in which it will be seen that rate of change of output voltage, with respect to input voltage, varies from about two-tenths of an input voltage of one hundred millivolts, to about fifteen hundredths for an input voltage of three hundred millivolts applied to the terminal 104.

A potentiometer 114 is connected in parallel with the diodes 110, 112 and provides an output gain adjustment, the arm of the potentiometer 114 being connected to a capacitor 116 to apply the shaper output to an amplifier stage, consisting of a transistor 118 and resistors 120, 122 and 124. The output of the amplifier is applied to a coupling capacitor 126 to couple the output to the input of the low pass filter. The low pass filter consists of transistors 128, 130, and 132, diodes 134 and 136, capacitors 138 and 140, and resistors 142, 144, 146, 148, 150, 152, 154 and 156. The output characteristic of the low pass filter is shown in FIGURE 9.

The output of the low pass filter is coupled by a coupling resistor 158 to the high pass filter, consisting of transistors 160, 162 and 164, diode 166, capacitors 168, 170, and 172, potentiometer 174 and resistors 176, 178, 180, 182, 184, 186, 188, 190, 192, 194 and 196. The output characteristic of the high pass filter is shown in FIGURE 10 and the combined output characteristic of the high and low pass filters is shown in FIGURE 9.

A coupling resistor 198 applies the output of the high pass filter to the detector which consists of a transistor 200, the emitter of which is connected by a resistor 202 to a terminal 204, to which is applied a positive six-volt potential. The collector of the transistor 202 is connected to an RC network consisting of a capacitor 206 and resistor 208. The capacitor 206 is also connected to an output terminal 210, to which a negative six-volt potential is applied. In conjunction with resistor 208, the capacitor 206 provides an averaging function. The resistor 208 is also connected to an output terminal 212 at which is available, for application to the indicator, an electrical potential, the magnitude of which corresponds to turbulence.

Power for the circuit is supplied by means of a positive eighteen-volt potential applied to a terminal 214 together with the aforementioned potentials applied to terminals 204 and 210. Typical values for the various components of the circuit of FIGURE 7 are as follows:

*Resistors in ohms*

| | |
|---|---:|
| 108 | 15,000 |
| Potentiometer 114 | 200,000 |
| 120 | 200,000 |
| 122 | 560 |
| 124, 144, 152, 158, 176, 180, 208 | 10,000 |
| 142, 154 | 560,000 |
| 146, 156 | 4,700 |
| 148 | 500 |
| 150, 186, 196, 198 | 1,000 |
| 174 | 500,000 |
| 178 | 56,000 |
| 182 | 5,600 |
| 184, 202 | 100 |
| 188, 192 | 20,000 |
| 190 | 200 |
| 194 | 18,000 |

*Capacitors in microfarads*

| | |
|---|---:|
| 116 | 500 |
| 126, 172 | 50 |
| 138, 140 | 30 |
| 168 | 1 |
| 206 | 2,000 |

Capacitor 170 is one hundred micro-microfarads.

*Semi-conductors*

| | |
|---|---:|
| 110, 112 | HU5 |
| 118 | 2N107 |
| 128, 130, 160, 162, 200 | 2N34 |
| 132, 164 | 2N35 |
| 134, 136, 166 | 1N626 |

The circuit is adjusted for operation by grounding the input terminal 104 and adjusting the potentiometer 174 for a zero indication on the indicator. The overall circuit gain is controlled by the potentiometer 114, but may also be reduced proportionately by decreasing the value of the resistor 124. Similarly, the band pass characteristics for the high and low pass filters may be varied by selecting different values for capacitors 138 and 140, with respect to the upper cutoff frequency, and capacitors 168 and 170 with respect to the lower cutoff frequency. Furthermore, it should be understood that the circuit of FIGURE 7 is only one embodiment of circuitry which may be utilized in the practice of the invention. Various combinations of conventional circuit elements may be substituted for the circuit of FIGURE 7 to provide the requisite two-thirds power function and band pass characteristics.

Although the circuit arrangement of FIGURE 7 including the shaper, low pass filter, high pass filter, and detector have been described in accordance with the preferred form of the present invention, it is to be understood that if the shaper circuit is arranged to generate a voltage signal in accordance with other than the two-thirds power of the mean airspeed, that the remainder of circuit arrangement may be employed in combination with the airspeed sensor 14 and nonlinear signal attenuator 24 previously described in conjunction with FIGURES 2 and 3. In such an arrangement the signal attenuator 24 may be coupled to the input terminal 104 of the shaper, to the arm of the potentiometer 14, to a junction of the resistor 158 and the capacitor 168, to the collector of the transistor 164, or to the output terminal 212 to provide the desired attenuation compensation necessary to provide a direct indication of $\epsilon$ independent of airspeed.

What is claimed is:

1. Apparatus for measuring fluid turbulence comprising a fluid velocity sensor, electrical signal generator means connected to said fluid velocity sensor for generating an electrical signal which is a predetermined function of the fluid velocity sensed, signal filter means having an input and an output and operable to pass a band of frequencies corresponding to wavelengths within a five-thirds spectral power range of fluid turbulence, and indicator means connected to the output of the filter means and operable in response to the electrical signal output of the filter means to provide an indication which is a function of the electrical signal output of the signal means.

2. The apparatus of claim 1 and in which the indicator means includes means for rectifying the output of the filter means, means for taking the mean of the rectified signal, and means for applying the mean of the rectified signal to an indicator.

3. The apparatus of claim 1 and in which the signal filter means is a band pass filter having a lower cutoff frequency of about one cycle per second.

4. The apparatus of claim 3 and in which the indicator means includes means for rectifying the output of the filter means, means for taking the mean of the rectified signal, and means for applying the mean of the rectified signal to an indicator.

5. Apparatus for measuring fluid turbulence comprising a fluid velocity sensor mounted on a platform relative to which fluid velocity is to be measured, a function generator having an input and output and operable to convert the fluid velocity sensed into an electrical signal, the magnitude of which is a function of the two-thirds power of the fluid velocity sensed, means connecting the sensor to the function generator, filter means operable to pass substantially only those frequencies corresponding to wavelengths within a five-thirds spectral power range of fluid turbulence, means connecting the output of the function generator to the input of the filter means, an indicator, an averaging circuit operable to convert the output of the filter means into the electrical signal usable by the indicator, means connecting the output of the filter means to the averaging circuit, and means connecting the output of averaging circuit to the indicator.

6. The apparatus of claim 5 and in which the filter means is a band pass filter having a low frequency cutoff of about one cycle per second.

7. Apparatus for measuring fluid turbulence comprising a turbulence sensor, an electrical signal generator coupled to the turbulence sensor for generating an electrical signal which is a predetermined function of the fluid turbulence sensed, a band pass filter for receiving the electrical signal, the band pass filter being arranged to only pass frequencies corresponding to wavelengths within a five-thirds spectral power range of fluid turbulence, an averaging circuit for receiving the electrical signal from the band pass filter, an indicator for receiving the electrical signal from the averaging circuit, fluid velocity sensor means, and means for attenuating the electrical signal by a factor which is a predetermined function of the fluid velocity sensed such that the electrical signal applied to the indicator provides a direct indication of fluid turbulence independent of fluid velocity.

8. Apparatus for measuring fluid turbulence comprising a fluid velocity sensor, an electrical signal generator coupled to the fluid velocity sensor for generating an electrical signal which is a predetermined function of the fluid velocity sensed, a band pass filter for receiving the electrical signal and arranged to only pass frequencies corresponding to wavelengths within a five-thirds spectral power range of fluid turbulence, an averaging circuit for averaging the electrical signal passed by the pass band filter, indicator means for receiving the electrical signal from the averaging circuit, and means for attenuating the electrical signal generated by the electrical signal generator means by a factor which is a predetermined function of the fluid velocity sensed such that the electrical signal applied to the indicator provides a direct indication of fluid turbulence independent of airspeed.

No references cited.

MALCOLM A. MORRISON, *Primary Examiner.*

K. W. DOBYNS, *Assistant Examiner.*

UNITED STATES PATENT OFFICE
CERTIFICATE OF CORRECTION

Patent No. 3,272,974                            September 13, 1966

Paul B. MacCready, Jr.

It is hereby certified that error appears in the above numbered patent requiring correction and that the said Letters Patent should read as corrected below.

Column 1, line 63, for that portion of the equation reading -- "$C_2 \epsilon 2/4$" read -- $C_2 \epsilon 2/3$ --; column 2, line 50, for that portion of equation (5) reading "-4/3" read -- -5/3 --; column 5, line 24, for "$U_4^{-4/3}$" read -- $U_0^{-4/3}$ --.

Signed and sealed this 29th day of August 1967.

(SEAL)
Attest:

ERNEST W. SWIDER
Attesting Officer

EDWARD J. BRENNER
Commissioner of Patents